(12) United States Patent
Li

(10) Patent No.: US 10,990,323 B2
(45) Date of Patent: Apr. 27, 2021

(54) FLASH MEMORY CONTROLLER, MEMORY DEVICE AND METHOD FOR ACCESSING FLASH MEMORY MODULE

(71) Applicant: Silicon Motion Inc., Hsinchu County (TW)

(72) Inventor: Kuan-Hui Li, Chiayi (TW)

(73) Assignee: Silicon Motion, Inc., Hsinchu County (TW)

( * ) Notice: Subject to any disclaimer, the term of this patent is extended or adjusted under 35 U.S.C. 154(b) by 122 days.

(21) Appl. No.: 16/423,171

(22) Filed: May 28, 2019

(65) Prior Publication Data

US 2020/0379674 A1 Dec. 3, 2020

(51) Int. Cl.
*G06F 3/06* (2006.01)
*G06F 12/0804* (2016.01)
*G06F 16/22* (2019.01)
*G06F 16/23* (2019.01)
*G06F 12/10* (2016.01)

(52) U.S. Cl.
CPC .......... *G06F 3/0659* (2013.01); *G06F 3/0604* (2013.01); *G06F 3/0647* (2013.01); *G06F 3/0679* (2013.01); *G06F 12/0804* (2013.01); *G06F 12/10* (2013.01); *G06F 16/2246* (2019.01); *G06F 16/2308* (2019.01); *G06F 2212/7201* (2013.01)

(58) Field of Classification Search
CPC .... G06F 3/0604; G06F 3/0611; G06F 3/0647; G06F 3/0656; G06F 3/0659; G06F 3/0679; G06F 12/0804; G06F 12/0893; G06F 12/10; G06F 16/2246; G06F 16/2308; G06F 2212/7201; G06F 2212/7203
USPC .......................................... 711/103, 118, 126
See application file for complete search history.

(56) References Cited

U.S. PATENT DOCUMENTS

| | | | |
|---|---|---|---|
| 6,216,199 B1* | 4/2001 | DeKoning | G06F 12/0864 711/118 |
| 7,730,222 B2 | 6/2010 | Passerini | |
| 2015/0242311 A1* | 8/2015 | Bulkowski | G06F 16/95 711/103 |
| 2020/0242021 A1* | 7/2020 | Gholamipour | G06F 12/0804 |
| 2020/0349072 A1* | 11/2020 | Fliess | G06F 12/0804 |

FOREIGN PATENT DOCUMENTS

TW    I405209 B1    8/2013

* cited by examiner

*Primary Examiner* — Gary J Portka
(74) *Attorney, Agent, or Firm* — Winston Hsu

(57) ABSTRACT

The present invention provides a flash memory controller, where the flash memory controller includes a read-only memory, a processor and a cache, the read-only memory stores a program code, and the processor executes the program code to perform access a flash memory module. When the processor receives first data from a host, the processor stores the first data into a region of the cache, and the processor builds or updates a binary tree according to the first data, wherein the binary tree is used when the processor receives a read command from the host.

16 Claims, 7 Drawing Sheets

US 10,990,323 B2

FLASH MEMORY CONTROLLER, MEMORY DEVICE AND METHOD FOR ACCESSING FLASH MEMORY MODULE

BACKGROUND OF THE INVENTION

1. Field of the Invention

The present invention relates to flash memory, and more particularly, to a searching method of a flash memory controller.

2. Description of the Prior Art

When a host wants to write data into a flash memory module via a flash memory controller, the host will send the data to the flash memory controller and the data is temporarily stored in a cache or a buffer within the flash memory controller, and the data is written into the flash memory module when the amount of data temporarily stored in the cache reaches a predetermined value. For example, the flash memory controller continuously receives the data from the host and stores the received data into the cache, and when the amount of the received data is enough to be written into several word lines of the flash memory module, the flash memory controller starts to move the data from the cache to the flash memory module.

Because the cache in the flash memory controller temporarily stores the data that has not been written into the flash memory module, when the host wants to the read this data, the flash memory controller can directly send the data stored in the cache to the host to shorten the access time. In detail, each data stored in the cache of the flash memory controller comprises a corresponding logical address, and when the host sends a read command comprising a specific logical address, the flash memory controller will search the logical addresses of the data temporarily stored in the cache to determine if one of the logical addresses meets the specific logical address, and if the cache has the data corresponding to the specific logical address, the flash memory controller can directly send the data to the host. However, if the data corresponding to the specific logical address is updated in a short time, that is the host transmits two or more data corresponding to the same specific logical address within a short time, the cache of the flash memory controller may have two or more data having the specific logical address, wherein the last data having the specific logical address is the valid data, and the previous data having the specific logical address is regarded as the invalid data. Therefore, to make sure that the flash memory controller able to send the valid data to the host, when the host sends the read command comprising the specific logical address, the flash memory controller needs to search all of the logical addresses of the data temporarily stored in the cache, causing the flash memory controller to be inefficient. In addition, because one logical address may correspond to two or more data within the cache, the conventional binary search method is not suitable for the flash memory controller.

SUMMARY OF THE INVENTION

It is therefore an objective of the present invention to provide a flash memory controller, which can build a binary tree with special information when the cache of the flash memory controller stores the data from the host, to solve the above-mentioned problems.

According to one embodiment of the present invention, a flash memory controller is disclosed. The flash memory controller comprises a read-only memory, a processor and a cache, wherein the read-only memory stores a program code, and the processor executes the program code to perform access a flash memory module. When the processor receives first data from a host, the processor stores the first data into a region of the cache, and the processor builds or updates a binary tree according to the first data, wherein the binary tree is used when the processor receives a read command from the host.

According to another embodiment of the present invention, a memory device is disclosed. The memory device comprises a flash memory module and a flash memory controller arranged to access the flash memory module. In the operations of the memory device, when the flash memory controller receives first data from a host, the flash memory controller stores the first data into a region of a cache within the flash memory controller, and the flash memory controller builds or updates a binary tree according to the first data, wherein the binary tree is used when the processor receives a read command from the host.

According to another embodiment of the present invention, a method for accessing a flash memory module is disclosed, wherein the method comprises the steps of: receiving first data from a host and storing the first data into a cache; building or updating a binary tree according to the first data; and when receiving a read command from the host, searching the binary tree to obtain required data.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims to refer to particular system components. As one skilled in the art will appreciate, manufacturers may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". The terms "couple" and "couples" are intended to mean either an indirect or a direct electrical connection. Thus, if a first device couples to a second device, that connection may be through a direct electrical connection, or through an indirect electrical connection via other devices and connections.

Figure 1:
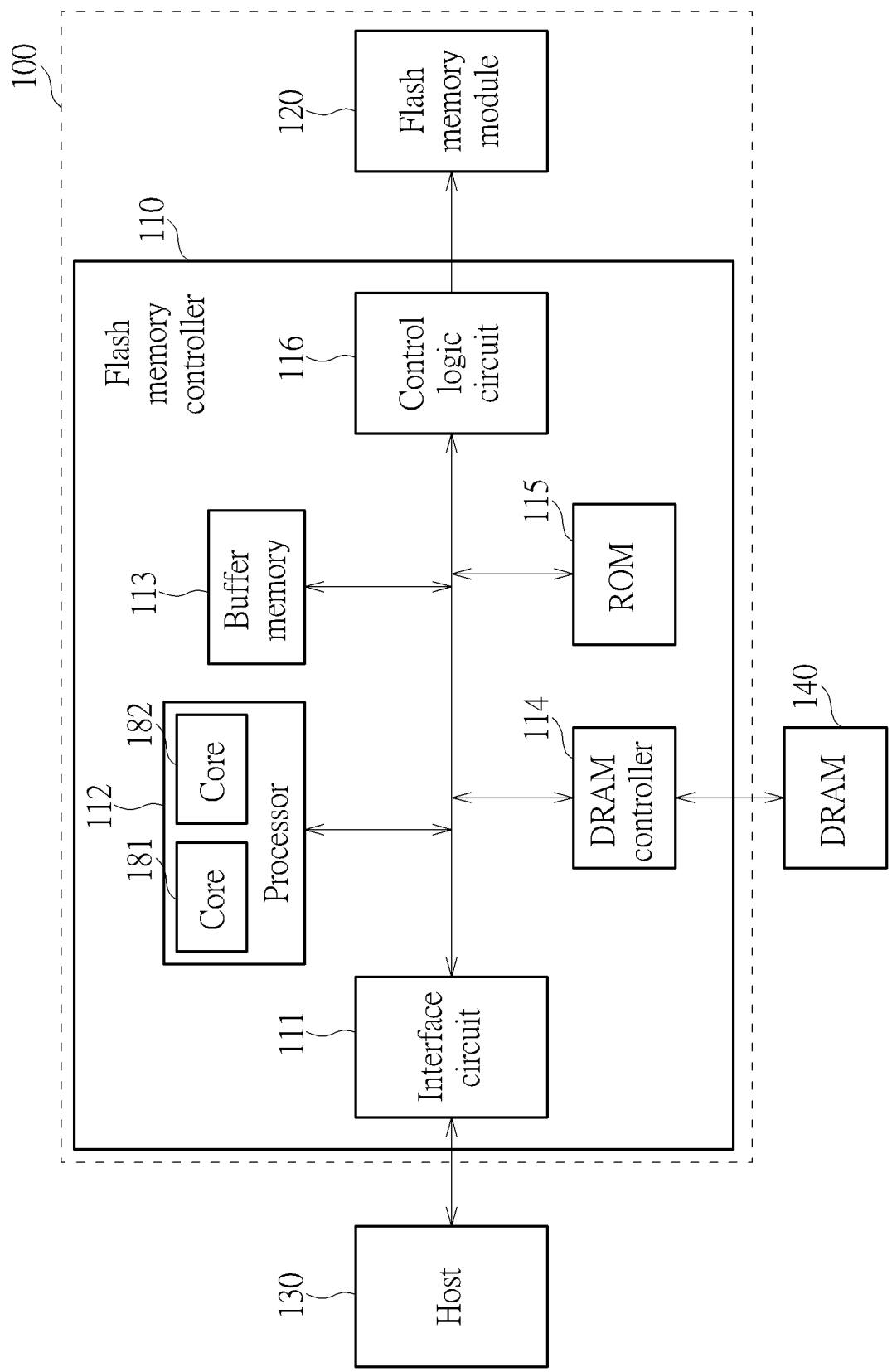
FIG. 1 is a diagram illustrating a memory device according to one embodiment of the present invention.
Figure 2:
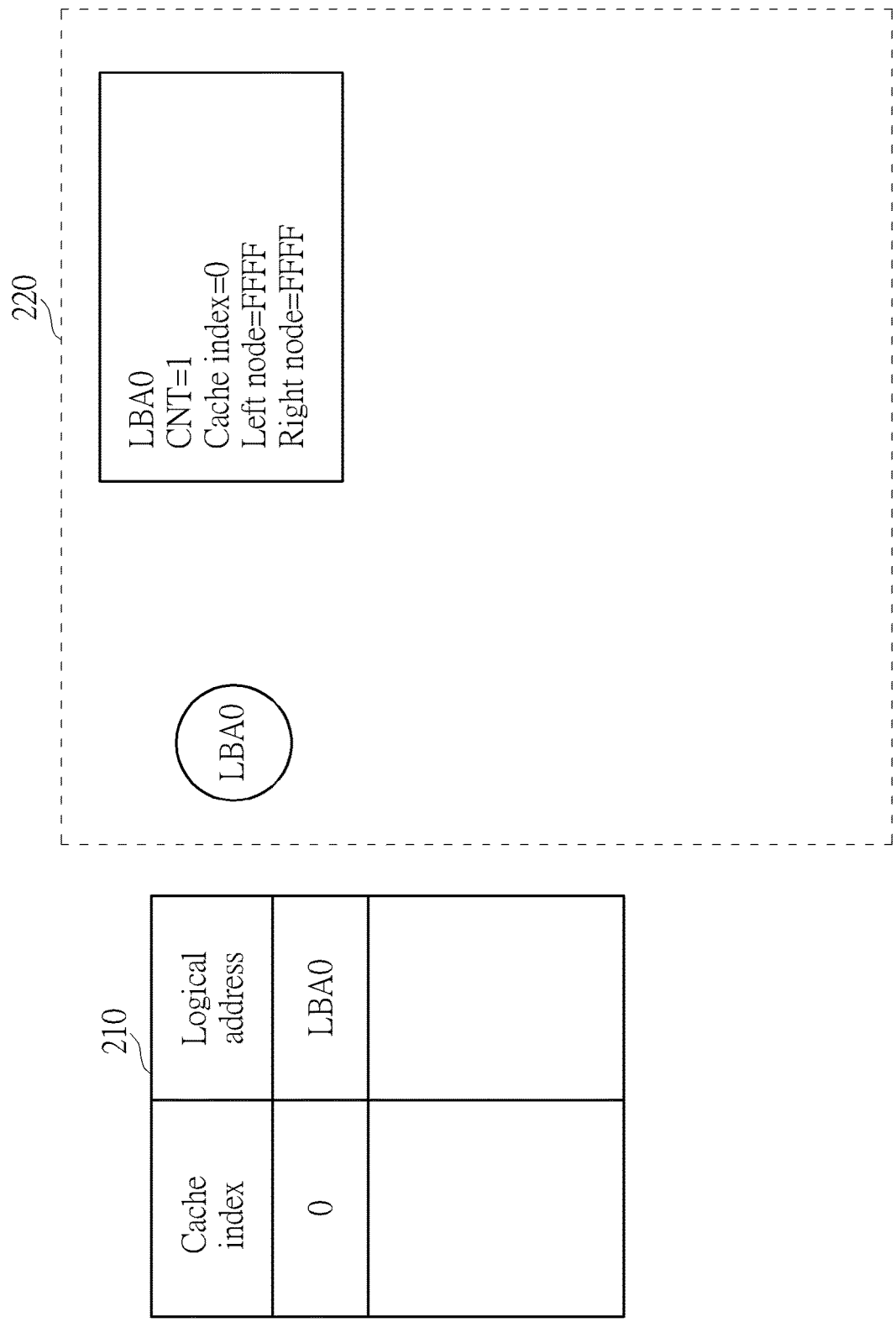
FIGS. 2-5 show how to build the binary tree when the flash memory controller receives the data from the host according to one embodiment of the present invention.

FIG. 1 is a diagram illustrating a memory device 100 according to one embodiment of the present invention. As shown in FIG. 1, the memory device comprises a first memory controller 110 and a flash memory module 120, wherein the flash memory controller 110 is arranged to access the flash memory module 120. In this embodiment, the flash memory controller 110 comprises an interface circuit 111, a processor 112, a buffer memory 113, a dynamic random access memory (DRAM) controller 114, a read-only memory (ROM) 115 and a control logic circuit 116, wherein the processor 112 may be a microprocessor or a central processing unit comprising two cores 181 and 182. The ROM 115 is used to store a program code, and the processor 112 executes the program code to control the access of the flash memory module 120. In the embodiment shown in FIG. 1, the core 181 of the processor 112 is mainly configured to control the operations between the flash memory controller 110 and the host 130, and the core 182 of the processor 112 is mainly configured to control the operations between the flash memory controller 110 and the flash memory module 120. In addition, the DRAM controller 114 is arranged to access a DRAM 140 positioned external to the flash memory controller 110.

The flash memory module 120 may comprise one or more flash memory chips, each flash memory chip comprises a plurality of blocks, wherein each block is a minimum erasing unit. In addition, each block comprises a plurality of pages, and each page is a minimum writing unit. In this embodiment, the flash memory module 120 is a 3D NAND-type flash memory module.

In one embodiment, the memory device 100 may be a portable memory device (e.g. a memory card conforming to SD/MMC, CF, MS or XD specifications), and the host 130 may be an electronic device that is connectable with a portable memory device, for example, mobile phones, laptop computers, personal computers, etc. In another embodiment, the memory device 100 may be a solid state drive (SSD) or an embedded storage device conforming to Universal Flash Storage (UFS) or Embedded Multi Media Card (EMMC) specifications, for being configured in an electronic device (for example, in a mobile phone, a laptop computer or a personal computer), and the host 130 may be a processor within this electronic device.

When the host 130 wants to write the data into the flash memory module 120, the data is temporarily stored in the buffer memory 113 or the DRAM 140, and the data is rewritten into the flash memory module 120 when the amount of the data stored in the buffer memory 113 or the DRAM 140 reaches a predetermined value (e.g. the data amount corresponding to several one or more word lines of the flash memory module 120). In this embodiment, the buffer memory 113 or the DRAM 140 can be regarded as a cache, that is when the host 130 sends a read command to ask for data whose logical address is recorded in the cache, the flash memory controller 120 can directly send this data to the host 130. As described in the background of the invention, different data stored in the buffer memory 113 or the DRAM 140 may have the same logical address, so the conventional controller needs to search all of the logical addresses of the data temporarily stored in the cache to make sure that the flash memory controller 120 can get the valid data. In this embodiment, to increase the searching speed, the processor 112 can build a binary tree when the data is received from the host 130, and when the host sends the read command to the flash memory controller 110, the processor 112 can search the logical address by using the binary tree to quickly obtain the required data, to improve the efficiency of the flash memory controller 110.

FIGS. 2-5 show how to build the binary tree when the flash memory controller 110 receives the data from the host 130 according to one embodiment of the present invention. In FIG. 1, it is assumed that the host 130 sends a first write command and first data with the logical address LBA0 to the flash memory controller 110, and the core 181 of the processor 112 stores the first data with the logical address LBA0 to the buffer memory 113 or the DRAM 140 (hereinafter, the buffer memory 113 is used as an example). In this embodiment, the first data is stored in a region corresponding to a cache index "0" of the buffer memory 113, and the buffer memory 113 comprises a table 210 recording the cache index and the corresponding logical address. Simultaneously, the core 181 sends the cache information to the core 182 to indicate that the first data is stored in the memory buffer 113. Then, when the core 182 is idle (e.g. at the busy time of the flash memory module 120), the core 182 can start to build a binary tree 220 according to the cache information from the core 181. Taking FIG. 2 as an example, the logical address LBA0 is the first node (top node) of the binary tree, and the binary tree 220 also records the information comprising the logical address (i.e. LBA0), the count CNT of the logical address LBA0 (because the buffer memory 113 has only one logical address LBA0, the count CNT=1), the cache index "0", the logical address of the left node (left child) and the logical address of the right node (right child), wherein the logical addresses of the left node and the right node are "FFFF" because no data follows the LBA0.

Figure 3:
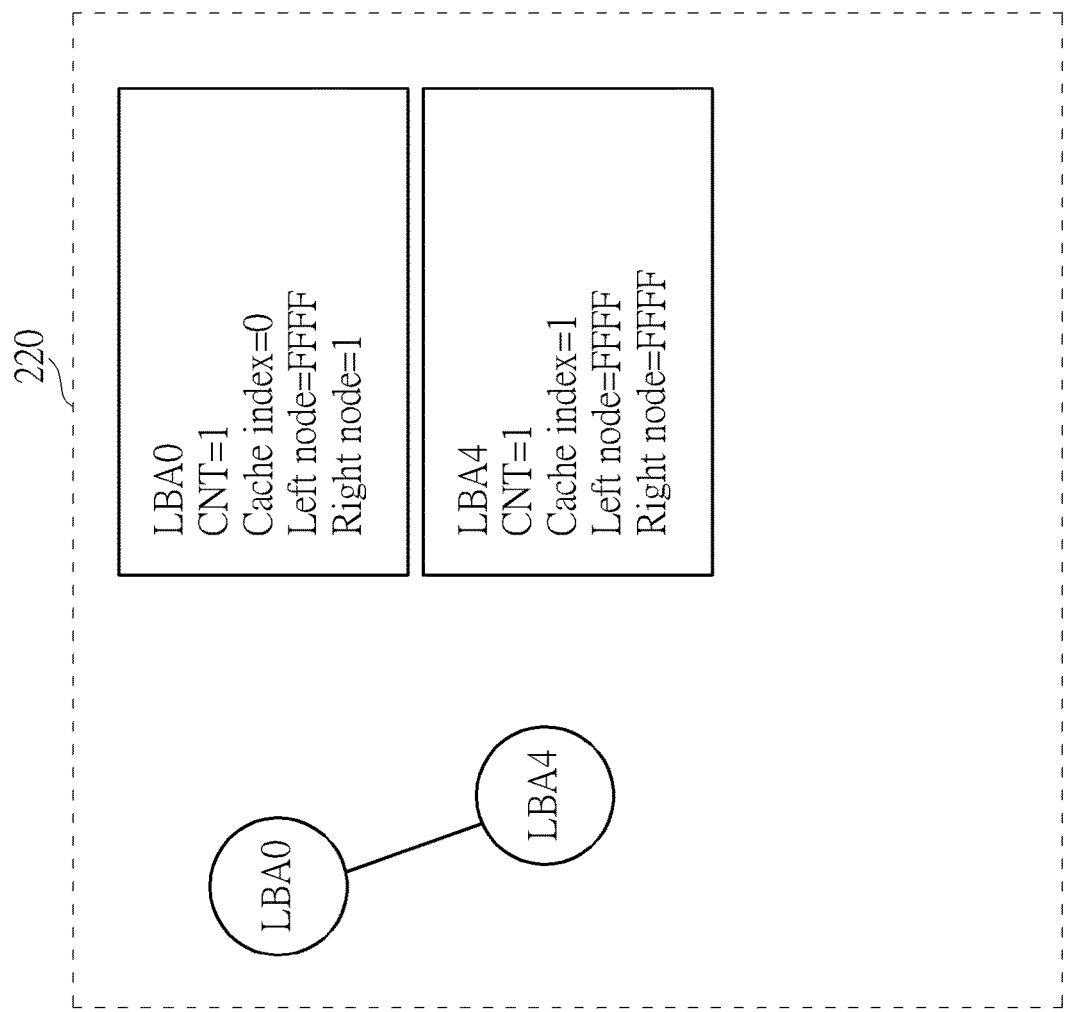

Then, the host 130 sends a second write command and second data with the logical address LBA4 to the flash memory controller 110 as shown in FIG. 3, and the core 181 of the processor 112 stores the second data with the logical address LBA4 to the buffer memory 113. In this embodiment, the second data is stored in a region corresponding to a cache index "1" of the buffer memory 113, and the table 210 records the cache index "1" and the corresponding logical address LBA4. Simultaneously, the core 181 sends the cache information to the core 182 to indicate that the second data is stored in the memory buffer 113. Then, when the core 182 is idle, the core 182 updates the binary tree 220 according to the cache information from the core 181. Taking FIG. 3 as an example, the logical address LBA4 is the right node following the top node of the binary tree (because the logical address LBA4 is greater than the logical address LBA0), and the binary tree 220 records the information comprising the logical address (i.e. LBA4), the count CNT of the logical address LBA4 (because the buffer memory 113 has only one logical address LBA4, the count CNT=1), the cache index "1", the logical address of the left node and the logical address of the right node, wherein the logical addresses of the left node and the right node are "FFFF" because no data follows the LBA4. In addition, because the logical address LBA4 is added to the right node of the logical address LBA0, the right node of the logical address LBA0 is updated to having the cache index "1".

Figure 4:
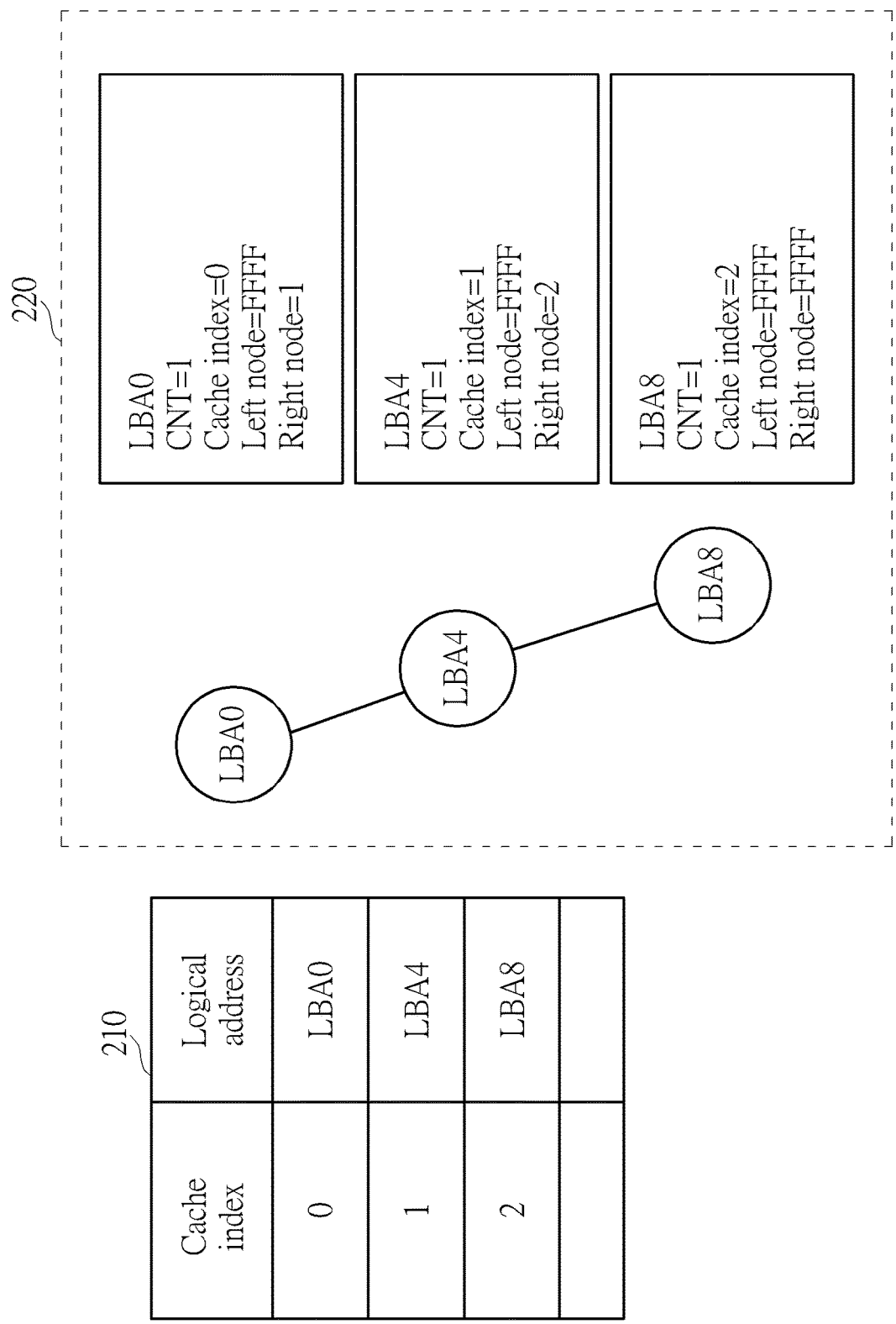

Then, the host 130 sends a third write command and third data with the logical address LBA8 to the flash memory controller 110 as shown in FIG. 4, and the core 181 of the processor 112 stores the third data with the logical address LBA8 to the buffer memory 113. In this embodiment, the third data is stored in a region corresponding to a cache index "2" of the buffer memory 113, and the table 210 records the cache index "2" and the corresponding logical address LBA8. Simultaneously, the core 181 sends the cache information to the core 182 to indicate that the third data is stored in the memory buffer 113. Then, when the core 182 is idle, the core 182 updates the binary tree 220 according to the cache information from the core 181. Taking FIG. 4 as an example, the logical address LBA8 is the right node following the logical address LBA4 of the binary tree (because the logical address LBA8 is greater than the logical address LBA4), and the binary tree 220 records the information comprising the logical address (i.e.LBA8), the count CNT of the logical address LBA8 (because the buffer memory 113 has only one logical address LBA8, the count CNT=1), the cache index "2", the logical address of the left node and the logical address of the right node, wherein the logical addresses of the left node and the right node are "FFFF" because no data follows the LBA8. In addition, because the logical address LBA8 is added to the right node of the logical address LBA4, the right node of the logical address LBA4 is updated to having the cache index "2".

Figure 5:
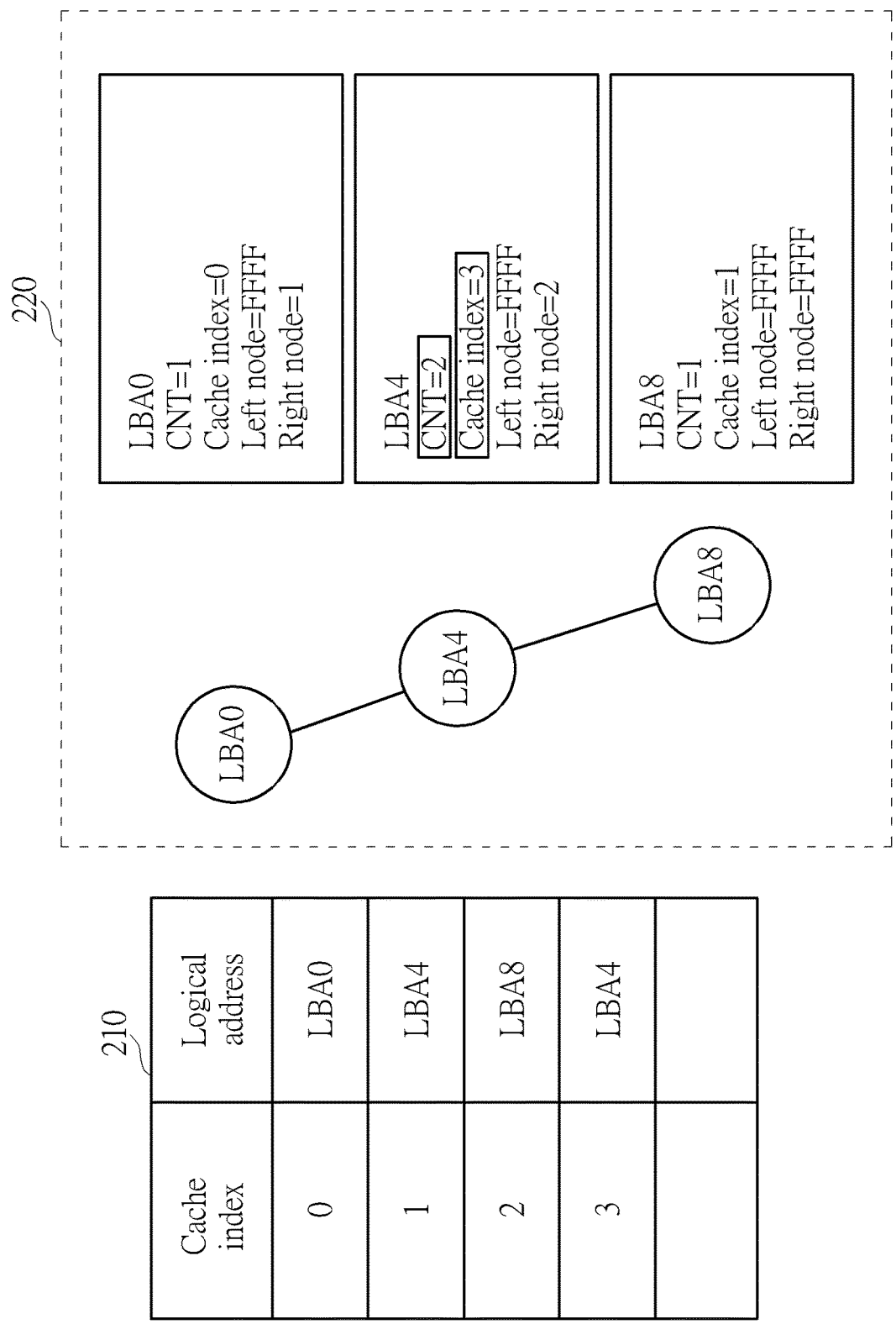

Then, the host 130 sends a fourth write command and fourth data with the logical address LBA4 to the flash memory controller 110 as shown in FIG. 5, and the core 181 of the processor 112 stores the fourth data with the logical address LBA4 to the buffer memory 113. In this embodiment, the fourth data is stored in a region corresponding to a cache index "3" of the buffer memory 113, and the table 210 records the cache index "3" and the corresponding logical address LBA4. Simultaneously, the core 181 sends the cache information to the core 182 to indicate that the fourth data is stored in the memory buffer 113. Then, when the core 182 is idle, the core 182 updates the binary tree 220 according to the cache information from the core 181. Taking FIG. 5 as an example, because the fourth data has the logical address LBA4 that has been recorded in the table 210 and the binary tree 220, that is the fourth data is used to update the second data (i.e. the second data becomes invalid data), the information of the logical address LBA4 in the binary tree 220 is updated so that the count CNT of the logical address LBA4 becomes "2", and the cache index becomes "3" corresponding to the fourth data.

In one embodiment, if the flash memory controller 110 receives a read command comprising the logical address LBA4 from the host 130, taking the binary tree 220 shown in FIG. 5 as an example, the core 181 or the core 182 compares the logical address LBA4 with the logical address LBA0 of the top node of the binary tree 220, and because the logical address LBA4 is greater than the logical address LBA0, the core 181 or the core 182 finds the right node of the top node in the next step. Then, because the right node of the top node of the binary tree 220 corresponds to the logical address LBA4 that meets the logical address in the read command, the core 181 or the core 182 can refer to the cache index "3" of the binary tree 220 to obtain the cache address of the required data, and the core 181 or the core 182 reads the fourth data stored in the region corresponding to cache index "3" and transmits the fourth data to the host 130, without accessing the flash memory module 120. In light of above, because the embodiment uses only two steps to find the required data, compared within the conventional art using four steps to find the required data (i.e. four data is stored in the buffer memory 113), the embodiment indeed improve the searching speed.

In addition, if the flash memory controller 110 receives a read command comprising the logical address LBA7 from the host 130, taking the binary tree 220 shown in FIG. 5 as an example, because the core 181 or the core 182 can determine that the logical address LBA7 is not stored in the buffer memory 113 by using only three steps (i.e. three layers of the binary tree 220 shown in FIG. 5). Then, the core 182 may read the data having the logical address LBA7 from the flash memory module 120, and sends the data to the host 130. In light of above, because the flash memory controller 110 can quickly determine if the logical address LBA7 is stored in the buffer memory 113 or not, the reading speed of the flash memory controller 110 can be improved.

Figure 6:
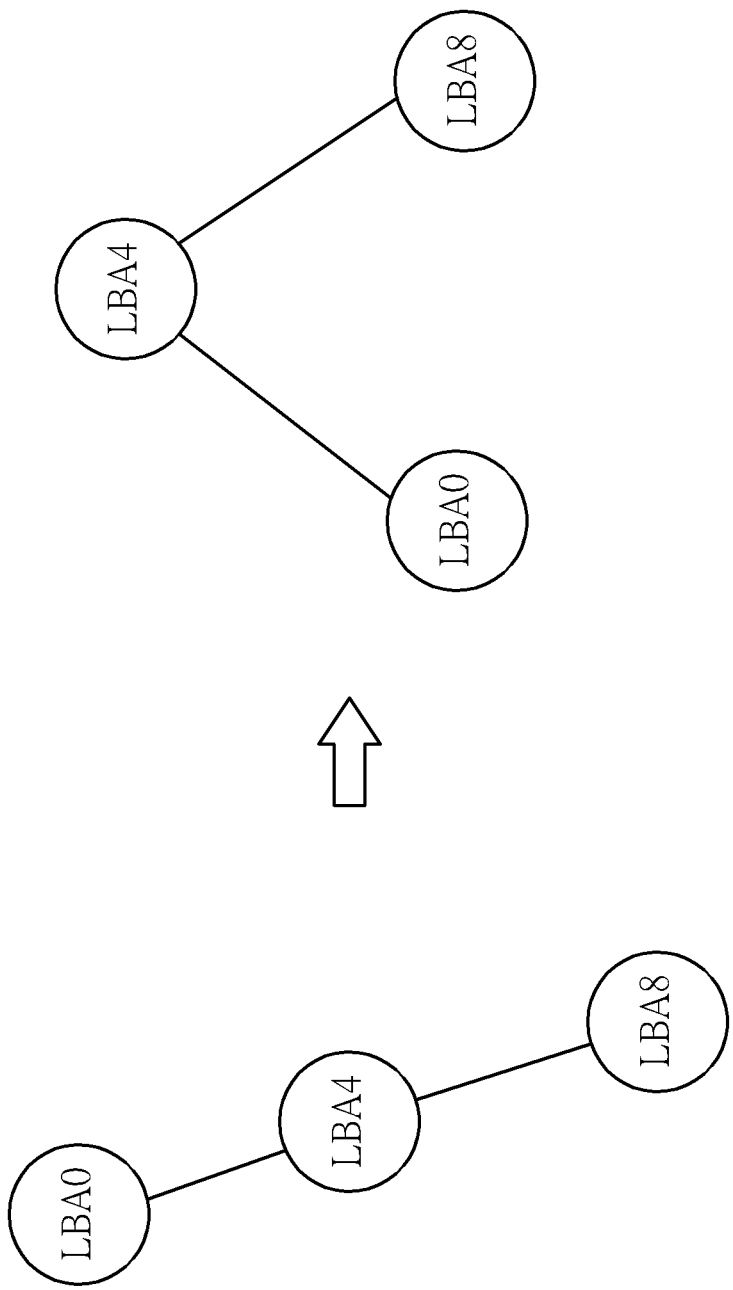
FIG. 6 shows that the processor re-arranges the binary tree to lower the layers according to one embodiment of the present invention.

In one embodiment, the core 182 of the processor 112 can re-arrange the binary tree 220 to lower the layers. For example, the core 182 may use a self-balancing binary search tree algorithm such as AVL tree or red-black tree to lower the layers. Taking FIG. 6 as an example, the binary tree 220 can be rotated so that the logical address LBA4 becomes the top node, the logical address LBA0 becomes the loft node of the logical address LBA4, therefore, the binary tree 220 is updated from three layers to two layers, and the searching speed can be further improved.

After the amount of data to be programmed into the flash memory module 120 reaches the predetermined value (e.g. multiple pages, one or more word line . . . ), the flash memory controller 110 writes the first data with the logical address LBA0, the second data with the logical address LBA4, the third data with the logical address LBA8, the fourth data with the logical address LBA4 and the following data into the flash memory module 120. Then, after the first data, the second data, the third data, the fourth data and the following data is removed from the buffer memory 113, the core 181 sends the information to the core 182 to notify that the binary tree 220 should be updated, and the core 182 updates the binary tree to remove the related information in the idle time.

Figure 7:
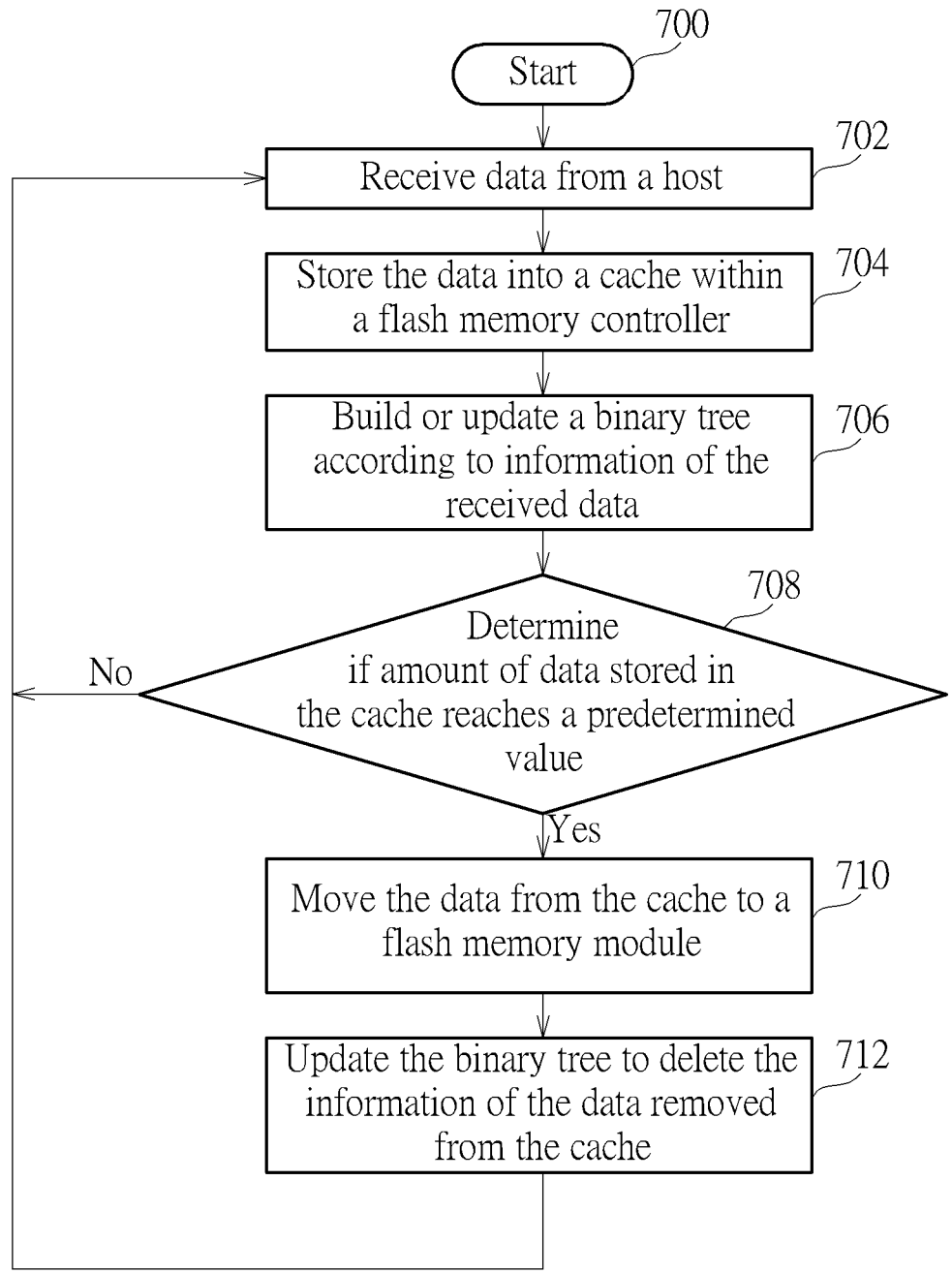
FIG. 7 is a flowchart of a method for accessing the flash memory module according to one embodiment of the present invention.

FIG. 7 is a flowchart of a method for accessing the flash memory module according to one embodiment of the present invention. Referring to FIGS. 1-6 and above descriptions, the flow is described as follows.

Step 700: the flow starts.

Step 702: receive data from a host.

Step 704: store the data into a cache within a flash memory controller.

Step 706: build or update a binary tree according to information of the received data.

Step 708: determine if amount of data stored in the cache reaches a predetermined value. If the amount of data stored in the cache reaches the predetermined value, the flow enters Step 710; and if the amount of data stored in the cache does not reach the predetermined value, the flow enters Step 702 to receive next data from the host.

Step 710: move the data from the cache to a flash memory module.

Step 712: update the binary tree to delete the information of the data removed from the cache.

Briefly summarized, in the flash memory controller of the present invention, when the flash memory controller receives the data from the host and stores the data into a cache, the flash memory controller builds or updates the binary tree according to the received data to make the following searching operations, if any, be faster. In addition, the binary tree is built or updated by the core circuit that is used for managing the operations between the flash memory controller and the flash memory module, therefore, because the core circuit inevitably has an idle time when the flash memory module is busy (reading or writing operations in the flash memory module), the binary tree can be managed when the core circuit is idle to avoid influencing the overall efficiency of the flash memory controller.

Those skilled in the art will readily observe that numerous modifications and alterations of the device and method may be made while retaining the teachings of the invention.

Accordingly, the above disclosure should be construed as limited only by the metes and bounds of the appended claims.

What is claimed is:

1. A flash memory controller, comprising:
    a read-only memory, for storing a program code;
    a processor, for executing the program code to perform access a flash memory module; and
    a cache;
    wherein when the processor receives first data from a host, the processor stores the first data into a region of the cache, and the processor builds or updates a binary tree according to the first data, wherein the binary tree is used when the processor receives a read command from the host; and when data amount of the data stored in the cache reaches a predetermined value, the processor moves the data from the cache to the flash memory module;
    wherein the processor comprises a first core and a second core, the first core is configured to control operations between the flash memory controller and the host, the second core is configured to control operations between the flash memory controller and the flash memory module; and the second core of the processor builds or updates the binary tree according to the first data.

2. The flash memory controller of claim 1, wherein the binary tree comprises a logical address of the first data, a count of the logical address of the first data, and a cache index of the region of the cache.

3. The flash memory controller of claim 2, wherein when the processor receives second data from the host after the binary tree is built or updated according to the first data, the processor stores the second data into another region of the cache, and if a logical address of second data is not recorded in the cache, the processor updates the binary tree to include the logical address of the second data, a count of the logical address of the second data, and a cache index of the other region of the cache.

4. The flash memory controller of claim 3, wherein if the logical address of second data the same as the logical address of the first data, the processor updates the binary tree to increase the count of the logical address of the first/second data, and update the cache index to be corresponding to the other region of the cache.

5. The flash memory controller of claim 2, wherein the logical address of the first data corresponds to a first node of the binary tree, and the binary tree further comprises information of a left node and a right node of the binary tree.

6. The flash memory controller of claim 1, wherein when the processor receives the first data from the host, the first core of the processor stores the first data into the region of the cache, and the first core sends the information of the first data to notify the second core to build or update the binary tree according to the first data.

7. A memory device, comprising:
    a flash memory module; and
    a flash memory controller, for accessing the flash memory module;
    wherein when the flash memory controller receives first data from a host, the flash memory controller stores the first data into a region of a cache within the flash memory controller, and the flash memory controller builds or updates a binary tree according to the first data, wherein the binary tree is used when the processor receives a read command from the host; and when data amount of the data stored in the cache reaches a predetermined value, the flash memory controller moves the data from the cache to the flash memory module;
    wherein the binary tree comprises a logical address of the first data, a count of the logical address of the first data, and a cache index of the region of the cache.

8. The memory device of claim 7, wherein when the flash memory controller receives second data from the host after the binary tree is built or updated according to the first data, the flash memory controller stores the second data into another region of the cache, and if a logical address of second data is not recorded in the cache, the flash memory controller updates the binary tree to include the logical address of the second data, a count of the logical address of the second data, and a cache index of the other region of the cache.

9. The memory device of claim 8, wherein if the logical address of second data the same as the logical address of the first data, the flash memory controller updates the binary tree to increase the count of the logical address of the first/second data, and update the cache index to be corresponding to the other region of the cache.

10. The memory device of claim 7, wherein the logical address of the first data corresponds to a first node of the binary tree, and the binary tree further comprises information of a left node and a right node of the binary tree.

11. The memory device of claim 7, wherein the flash memory controller comprises a processor comprising a first core and a second core, the first core is configured to control operations between the flash memory controller and the host, the second core is configured to control operations between the flash memory controller and the flash memory module; and the second core of the processor builds or updates the binary tree according to the first data.

12. The memory device of claim 11, wherein when the flash memory controller receives the first data from the host, the first core of the processor stores the first data into the region of the cache, and the first core sends the information of the first data to notify the second core to build or update the binary tree according to the first data.

13. A method for accessing a flash memory module, comprising:
    receiving first data from a host and storing the first data into a cache;
    building or updating a binary tree according to the first data;
    when receiving a read command from the host, searching the binary tree to obtain required data;
    when data amount of the data stored in the cache reaches a predetermined value, moving the data from the cache to the flash memory module;
    writing the first data into the flash memory module;
    deleting the first data from the cache; and
    updating the binary tree to delete information of the first data.

14. The method of claim 13, wherein the binary tree comprises a logical address of the first data, a count of the logical address of the first data, and a cache index of the region of the cache.

15. The method of claim 14, further comprising:
    receiving second data from the host after the binary tree is built or updated according to the first data;
    storing the second data into another region of the cache; and
    if a logical address of second data is not recorded in the cache, updating the binary tree to include the logical address of the second data, a count of the logical address of the second data, and a cache index of the other region of the cache.

16. The method of claim 15, further comprising:
if the logical address of second data the same as the logical address of the first data, updating the binary tree to increase the count of the logical address of the first/second data, and update the cache index to be corresponding to the other region of the cache.

* * * * *